(12) United States Patent
Lee et al.

(10) Patent No.: US 10,115,531 B2
(45) Date of Patent: Oct. 30, 2018

(54) ENERGY STORAGE DEVICE HAVING IMPROVED HEAT-DISSIPATION CHARACTERISTIC

(71) Applicant: LS Mtron Ltd., Anyang-si, Gyeonggi-do (KR)

(72) Inventors: Jung-Gul Lee, Anyang-si (KR); Tae-Ho Suh, Gunpo-si (KR)

(73) Assignee: LS MITRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/503,765

(22) PCT Filed: Jun. 26, 2015

(86) PCT No.: PCT/KR2015/006596
§ 371 (c)(1),
(2) Date: Feb. 14, 2017

(87) PCT Pub. No.: WO2016/027978
PCT Pub. Date: Feb. 25, 2016

(65) Prior Publication Data
US 2017/0278641 A1    Sep. 28, 2017

(30) Foreign Application Priority Data

Aug. 19, 2014 (KR) .................. 10-2014-0107939
Dec. 12, 2014 (KR) .................. 10-2014-0179732
Jun. 18, 2015 (KR) .................. 10-2015-0086880

(51) Int. Cl.
*H01M 6/42* (2006.01)
*H01G 2/08* (2006.01)
(Continued)

(52) U.S. Cl.
CPC ............... *H01G 11/18* (2013.01); *H01G 2/08* (2013.01); *H01G 11/10* (2013.01); *H01M 10/613* (2015.04); *H01M 10/6551* (2015.04); *H01M 10/6554* (2015.04); *H01G 11/78* (2013.01); *H01G 11/82* (2013.01)

(58) Field of Classification Search
CPC .......... H01G 11/18; H01G 11/82; H01G 2/14; H01G 2/08; H01G 4/38; Y02E 60/12
USPC ....................... 429/156; 361/274.3, 272, 328
See application file for complete search history.

(56) References Cited

U.S. PATENT DOCUMENTS

2010/0129703 A1    5/2010  Caumont et al.
2011/0090614 A1    4/2011  Guerin et al.
(Continued)

FOREIGN PATENT DOCUMENTS

EP    2 187 473 A1    5/2010
JP    2002093470 A    3/2002
(Continued)

OTHER PUBLICATIONS

Search Report, dated Sep. 25, 2015, for International Application No. PCT/KR2015/006596.
(Continued)

*Primary Examiner* — Eric Thomas
*Assistant Examiner* — Arun Ramaswamy
(74) *Attorney, Agent, or Firm* — K&L Gates LLP

(57) ABSTRACT

An energy storage device having improved heat-dissipating includes a cell assembly formed by connecting at least two cylindrical energy storage cells in series, a case having an accommodation portion shaped corresponding to an outer surface of the energy storage cells to accommodate the cell assembly, and a heat-dissipating pad installed between an outer surface of the energy storage cells of the cell assembly and an inner surface of the accommodation portion, wherein the case includes at least two case blocks, and wherein the accommodation portion is formed by coupling the case blocks.

17 Claims, 10 Drawing Sheets

(51) Int. Cl.

| | | |
|---|---|---|
| H01G 2/00 | (2006.01) | |
| H01G 5/019 | (2006.01) | |
| H01G 4/38 | (2006.01) | |
| H01G 2/14 | (2006.01) | |
| H01G 11/18 | (2013.01) | |
| H01G 11/82 | (2013.01) | |
| H01G 11/10 | (2013.01) | |
| H01M 10/6551 | (2014.01) | |
| H01M 10/6554 | (2014.01) | |
| H01M 10/613 | (2014.01) | |
| H01G 11/78 | (2013.01) | |

(56) References Cited

U.S. PATENT DOCUMENTS

2012/0050992 A1  3/2012  Ra et al.
2012/0231309 A1  9/2012  Itoi et al.

FOREIGN PATENT DOCUMENTS

| JP | 2004071168 A | 3/2004 |
|----|---|---|
| JP | 2005056837 A | 3/2005 |
| JP | 2010-123349 A | 6/2010 |
| JP | 2010225338 A | 10/2010 |
| JP | 2011009477 A | 1/2011 |
| JP | 2011134523 A | 7/2011 |
| JP | 2012222097 A | 11/2012 |
| JP | 2013-089735 A | 5/2013 |
| KR | 10-2012-0019845 A | 3/2012 |
| KR | 10-2013-0093697 A | 8/2013 |
| KR | 10-1341474 B1 | 12/2013 |
| WO | 2012/035683 A1 | 3/2012 |
| WO | 2014033377 A1 | 3/2014 |

OTHER PUBLICATIONS

Written Opinion, dated Sep. 25, 2015, for International Application No. PCT/KR2015/006596.

FIG. 8

| CONTACT ANGLE | 10°(α) | 30°(α) | 60°(α) | 90°(α) | 120°(α) |
|---|---|---|---|---|---|
| SHAPE | | | | | |
| HEAT-DISSIPATING EFFICIENCY | 90.66% | 97.28% | 98.94% | 99.49% | 99.67% |
| PRODUCT MASS | 15.76kg (−14.79%) | 16.62kg (−10.17%) | 18.05kg (+00.00%) | 21.55kg (+16.49%) | 23.52kg (+27.16%) |

ENERGY STORAGE DEVICE HAVING IMPROVED HEAT-DISSIPATION CHARACTERISTIC

CROSS-REFERENCE TO RELATED APPLICATION(S)

The present application is a U.S. National Phase entry from International Application No. PCT/KR2015/006596, filed Jun. 26, 2015, which claims priority to Korean Patent Application Nos. 10-2014-0107939, 10-2014-0179732 and 10-2015-0086880, filed Aug. 19, 2014, Dec. 12, 2014 and Jun. 18, 2015, respectively, the disclosures of which are incorporated by reference herein in their entireties.

BACKGROUND OF THE INVENTION

1. Field of the Invention

The present disclosure relates to an energy storage device, and more particularly, to an energy storage device having an improved heat-dissipation characteristic.

2. Description of Related Art

Generally, an ultra-capacitor is also called a super capacitor and serves as an energy storage device having characteristics in between an electrolytic condenser and a secondary battery. The ultra-capacitor is a next-generation electric energy storage device which may be used together with, or instead of, a secondary battery due to high efficiency and semi-permanent life span.

The ultra-capacitor is used as a substitute for a storage battery when an application is not easy to maintain and require a long-term life span. The ultra-capacitor has a rapid charge/discharge rate and thus may be used as an auxiliary power source of a cellular phone, a notebook, a PDA or the like, which is a mobile communication information device. In addition, the ultra-capacitor is very suitable as a main or auxiliary power source of an electric vehicle, a pilot lamp on the road, an uninterrupted power supply (UPS) or the like, which demands a high capacity.

When the ultra-capacitor is applied, a high-voltage module of several thousand Farad or several hundred bolts is required in order to use the ultra-capacitor as a high-voltage battery. The high-voltage module may be configured by connecting a required number of ultra-capacitors in a case.

FIG. 1 is a diagram showing an existing ultra-capacitor module.

As shown in FIG. 1, the existing ultra-capacitor module includes an ultra-capacitor array 10, a case 20 accommodating the ultra-capacitor array 10, and covers 30, 40 covering upper and lower openings of the case 20. The ultra-capacitor array 10 is configured by connecting electrode terminals of a plurality of ultra-capacitors by means of a bus bar 11 and coupling them by nuts.

The ultra-capacitor module may improve energy storage characteristics by operating a plurality of ultra-capacitors. However, the heat generated when operating the ultra-capacitor module also increases rapidly, which may deteriorate reliability or stability of the ultra-capacitor module.

The existing ultra-capacitor module as described above dissipates heat mainly through the bus bar 11 serving as a connection member connecting adjacent ultra-capacitors and the covers 30, 40 made of metal and covering upper and lower surfaces of the case 20. However, a side of the case 20 is made of a synthetic resin in order to reduce a weight of the ultra-capacitor module and lower a production cost thereof. In addition, the side of the case 20 has a plate shape, and thus a contact area with the ultra-capacitor is small and thus does not substantially dissipate heat.

In addition, in the existing technique, the ultra-capacitor may mainly dissipate heat through the bus bar 11, but the bus bar 11 is not able to efficiently dissipate heat due to a small heat-dissipating area. Thus, due to the increased temperature in the case, the life span of the ultra-capacitor may be reduced.

(Patent Literature 1) Korean Patent Registration No. 10-1341474 (published on Dec. 13, 2013)

SUMMARY OF THE INVENTION

The present disclosure is designed to solve the problems of the related art, and therefore the present disclosure is directed to providing an energy storage device having an improved heat-dissipating characteristic, which may dissipate heat through a side of a case with a broad contact area when energy storage cells such as ultra-capacitors are accommodated in the case.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an energy storage device, comprising: a cell assembly formed by connecting at least two cylindrical energy storage cells in series; a case having an accommodation portion shaped corresponding to an outer surface of the energy storage cells to accommodate the cell assembly; and a heat-dissipating pad installed between an outer surface of the energy storage cells of the cell assembly and an inner surface of the accommodation portion, wherein the case includes at least two case blocks, and wherein the accommodation portion is formed by coupling the case blocks.

The energy storage cells may contact the heat-dissipating pad with a central angle of 30 to 60 degrees.

The accommodation portion may form an are with a length greater than a length of the heat-dissipating pad.

The heat-dissipating pad may have elasticity, and an interval between the accommodation portion and the energy storage cells may be smaller than a thickness of the heat-dissipating pad before being compressed and greater than a diameter tolerance of the energy storage cells.

The heat-dissipating pad may be attached to the energy storage cells.

The heat-dissipating pad may be a thermal conductive filler.

An adhesive layer may be provided at one side of the heat-dissipating pad.

The energy storage cells may be ultra-capacitors.

The case block may include a plurality of convex portions having the same arc shape as an outer shape of the energy storage cells; a convex portion connector configured to connecting the plurality of convex portions; and a concave portion formed between the convex portions and the convex portion connector.

At least one heat-dissipating plate may be formed at the concave portion to protrude perpendicularly.

The case block may have an 'L' shape or a '⊏' shape.

When the case block has an 'L' shape, one of outermost convex portions of the plurality of convex portions may be connected so that the are shapes of the convex portions are connected.

The case block may further include a case block connector extending from one of the outermost convex portions and bent in a longitudinal direction of the case block.

When the case block has a ' ⊂ ' shape, outermost convex portions of the plurality of convex portions may be connected so that the are shapes of the convex portions are connected.

The case block may further include a case block connector extending from each of the outermost convex portions and bent in a longitudinal direction of the case block.

A tab may be formed at the convex portion connector to cover a cover.

A distance between the energy storage cells and the case may be gradually increasing from an end point of the heat-dissipating pad so that the energy storage cells and the case are insulated from each other.

An insulation film may be further formed at an outer surface of the energy storage cell.

Advantageous Effects

In the present disclosure, heat is dissipated through not only connection members such as nuts and bus bars but also a heat-dissipating pad installed between a case and energy storage cells, and thus a contact area between the energy storage cells and the case increases, thereby improving a heat-dissipating characteristic.

In the present disclosure, since the case accommodating several energy storage cells is fabricated by coupling a plurality of case blocks, the heat-dissipating pad may be installed easily, and the case may be fabricated with a low cost.

In the present disclosure, it is possible to optimize a product mass of the energy storage device along with the improvement of the heat-dissipating characteristic.

In the present disclosure, a distance between the energy storage cell and the case is gradually increasing from both front ends of the heat-dissipating pad, and thus the case and the energy storage cell may be naturally insulated from each other, thereby improving product stability.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 8 is a diagram showing a contact shape, heat-dissipating efficiency and a product mass of the heat-dissipating pad and the energy storage cell depending on an angle, according to an embodiment of the present disclosure.

DETAILED DESCRIPTION OF THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the present disclosure, if it is judged that detailed explanation on a known technique or configuration may unnecessarily make the essence of the present disclosure vague, the detailed explanation will be omitted.

Figure 1:
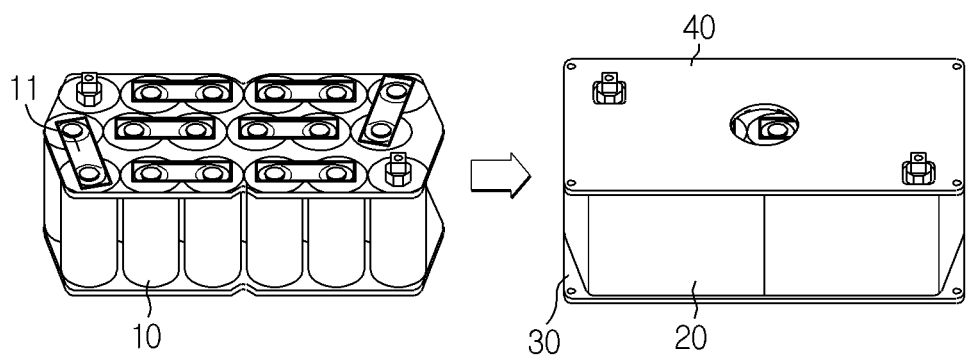
FIG. 1 is a diagram showing an existing energy storage device module.
Figure 2:
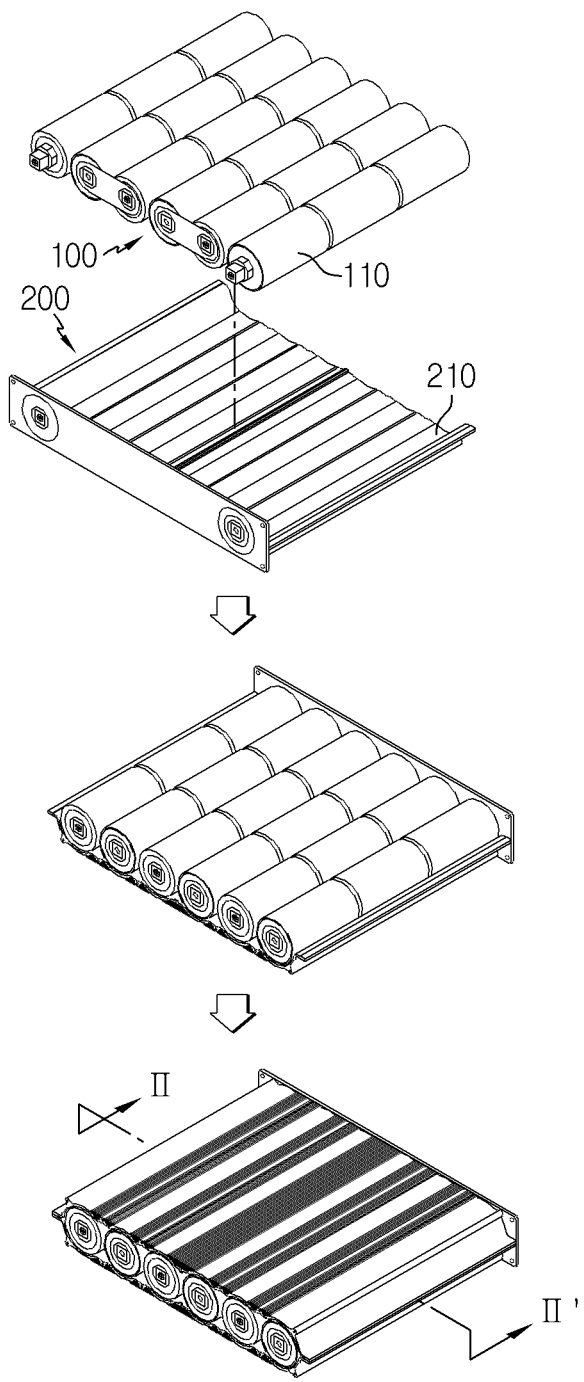
FIG. 2 is a diagram showing an energy storage device according to an embodiment of the present disclosure.
Figure 3:
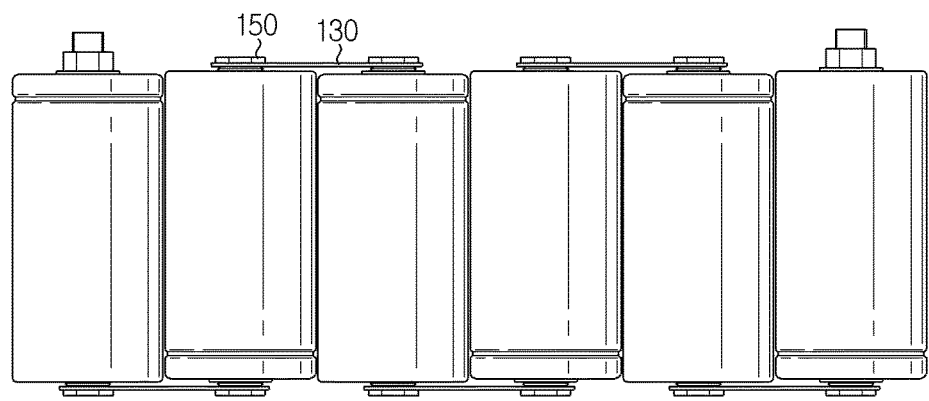
FIG. 3 is a diagram showing a connection between an energy storage cell according to another embodiment of the present disclosure
Figure 4:
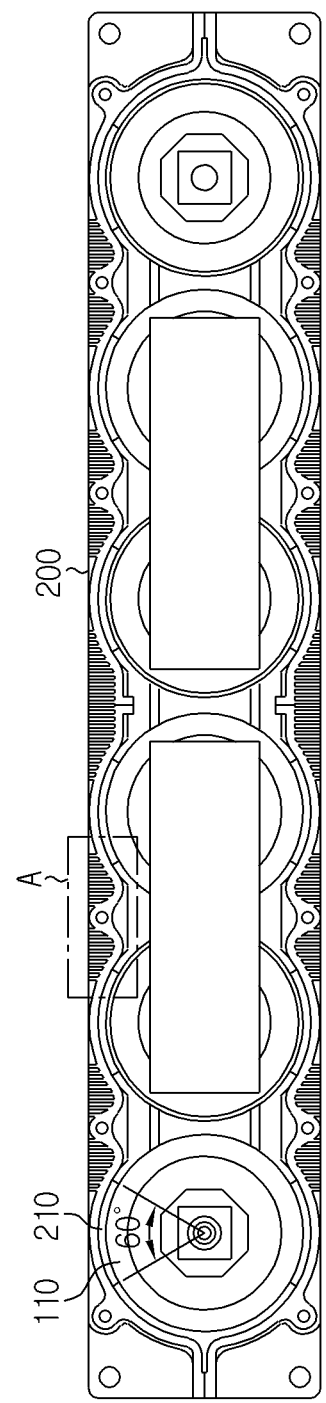
FIG. 4 is a sectional view, taken along the line II-II' of FIG. 2.

FIG. 2 is a diagram showing an energy storage device according to an embodiment of the present disclosure, FIG. 3 is a diagram showing a connection between an energy storage cell according to another embodiment of the present disclosure, and FIG. 4 is a sectional view, taken along the line II-II' of FIG. 2.

Referring to FIGS. 2 to 4, the energy storage device of this embodiment includes a cell assembly 100 having at least two energy storage cells 110 connected in series, and a case 200 accommodating the cell assembly 100.

The cell assembly 100 may be formed by connecting at least two energy storage cells 110 in series. The energy storage cell 110 may be an ultra-capacitor, and in this embodiment, the energy storage cell employs an ultra-capacitor. However, the energy storage cell may be any cell capable of storing electric energy, for example a secondary battery, a battery cell or the like, without being limited thereto.

The ultra-capacitor 110 has a rapid charge/discharge rate and thus may be used as an auxiliary power source of a cellular phone, a notebook, a PDA or the like, which is a mobile communication information device. In addition, the ultra-capacitor may be used as a main or auxiliary power source of an electric vehicle, a hybrid electric vehicle, a power unit for a solar cell, an uninterrupted power supply (UPS) or the like, which demands a high capacity.

The ultra-capacitor 110 may have a cylindrical shape and may be connected to another ultra-capacitor in series in a longitudinal direction, where an electrode is formed, as shown in FIG. 2 to configure the cell assembly 100. At this time, the ultra-capacitor 110 may be connected to an adjacent ultra-capacitor by means of a connection member, for example a nut and a bus bar.

In addition, as shown in FIG. 3, it is also possible that ultra-capacitors 110 are located in parallel, and in this state, a positive electrode terminal of a first ultra-capacitor and a negative electrode terminal of a second ultra-capacitor are connected in series by means of a connection member such as a bus bar 130 and a nut 150 to form the cell assembly 100. At this time, a plurality of ultra-capacitors 110 may configure the cell assembly 100 by connecting positive electrode terminals and negative electrode terminals by means of the bus bar 130 and coupling them by means of the nut 150. The cell assembly 100 may be accommodated in the case 200 to configure an ultra-capacitor module.

The case 200 may accommodate the cell assembly 100 formed by connecting the ultra-capacitors 110 in series. The case 200 may have an accommodation portion shaped corresponding to an outer surface of the ultra-capacitors 110 so that the cell assembly 100 formed by connecting the ultra-capacitors 110 in series may be accommodated therein.

The case 200 may be formed by coupling at least two case blocks (510 in FIG. 5 or 610 in FIG. 6) having the same shape. The accommodation portion accommodating the cell assembly 100 may be formed by coupling the case blocks (510 in FIG. 5 or 610 in FIG. 6). The case blocks (510 in FIG. 5 or 610 in FIG. 6) will be described below in more detail with reference to FIGS. 5 and 6.

Figure 5:
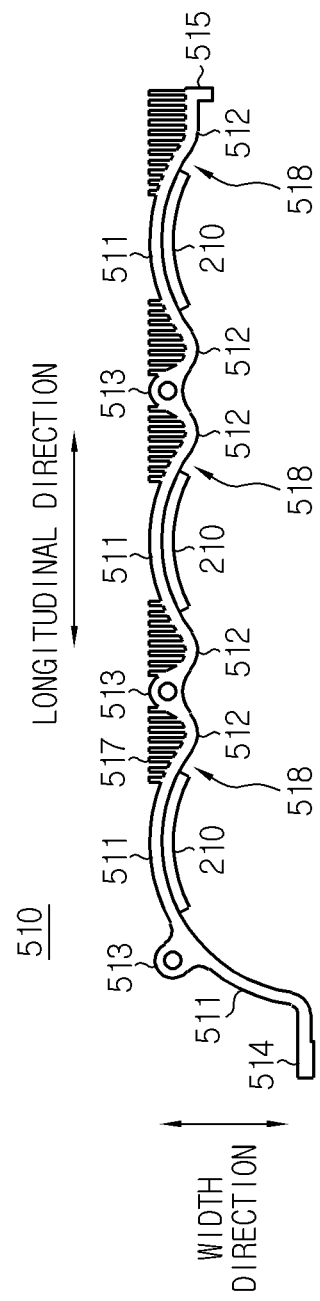
FIG. 5 is a diagram showing a case block according to an embodiment of the present disclosure.

FIG. 5 is a diagram showing a case block according to an embodiment of the present disclosure.

Referring to FIG. 5, the case block 510 may have an 'L' shape and includes an accommodation portion 518 shaped corresponding to an outer shape of the ultra-capacitor 110. If the ultra-capacitor 110 has a cylindrical shape, the inner surface of the case block 510 contacting the outer surface of the ultra-capacitor 110 may have a rounded shape in a cylinder. The case 200 may be fabricated by coupling four case blocks with an 'L' shape, and accordingly the accommodation portion 518 may be formed.

In more detail, as shown in FIG. 5, the case block 510 includes a plurality of convex portions 511 having the same arc shape as the outer shape of the ultra-capacitor 110, a convex portion connector 513 connecting the convex portions 511, a concave portion 512 formed between the convex portion 511 and the convex portion connector 513, and case block connectors 514, 515 connecting the case blocks 510.

The plurality of convex portions 511 have the same arc shape as the outer shape of the ultra-capacitor 110 to form the accommodation portion 518 accommodating the ultra-capacitor 110, and a heat-dissipating pad 210 is attached to an inner side thereof. The heat-dissipating pad 210 emits heat generated from the ultra-capacitor 110 to the convex portion 511 and also gives an insulation function between the ultra-capacitor 110 and the convex portion 511 (namely, the case 200). The convex portions 511 are connected by the convex portion connector 513, and a tab is formed at the convex portion connector 513 to fix an upper cover and a lower cover which cover the case 200. The tab is a structure for bolting, and a bolt for fixing the case 200 and the covers is inserted therein.

The case block 510 formed by connecting the plurality of convex portions 511 has an 'L' shape. In order to connect the case blocks 510 in a width direction, one of outermost convex portions is disposed and connected in a width direction, and the other convex portions are disposed and connected in a longitudinal direction. In other words, one of outermost convex portions of the plurality of convex portions 511 in a longitudinal direction is connected so that the arc shapes of the convex portions 511 are connected.

The concave portion 512 is formed between the convex portion 511 and the convex portion connector 513. The concave portion 512 is formed by bending back a part of the convex portion 511 outwards in order to ensure an insulation distance, as described later. A plurality of heat-dissipating plates 517 are perpendicularly installed to the concave portion 512 at regular intervals to dissipate heat generated from the ultra-capacitor 110. In other words, in order to enhance heat-dissipating efficiency by means of air flows among the heat-dissipating plates 517, the heat-dissipating plates 517 are perpendicularly installed at regular intervals. In addition, in order to enlarge a heat-dissipating area, the plurality of heat-dissipating plates 517 are installed. At this time, the heat-dissipating plates 517 are formed to have the same height as the convex portion connector 513. In FIG. 5, it is depicted that the concave portion 512 is not formed at both sides of the convex portion connector 513 located at a leftmost location in a longitudinal direction, but the concave portion 512 may be formed at both sides, similar to other convex portion connectors 513.

The case block connectors 514, 515 connect the cable blocks 510. Among the case block connectors 514, 515, the case block connector 514 extends from the convex portion 511 and is bent in a longitudinal direction, and also the case block connector 514 connects the cases block 510 in a width direction. Among the case block connectors 514, 515, the case block connector 515 extends from the convex portion 511 and is bent in a width direction, and also the case block connector 515 connects the case blocks 510 in a longitudinal direction.

Figure 6:
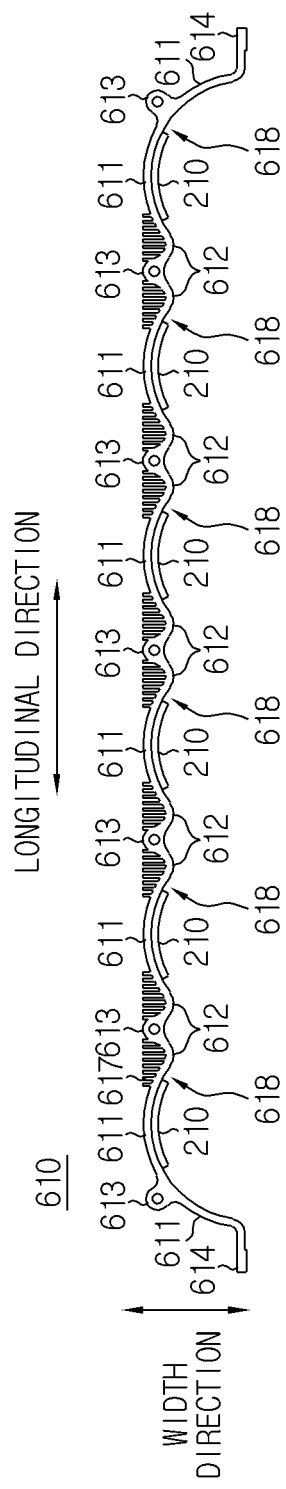
FIG. 6 is a diagram showing a case block according to another embodiment of the present disclosure.

FIG. 6 is a diagram showing a case block according to another embodiment of the present disclosure.

Referring to FIG. 6, the case block 610 has a '⊂' shape and also has an accommodation portion 618 shaped corresponding to an outer shape of the ultra-capacitor 110. If the ultra-capacitor has a cylindrical shape, the inner surface of the case block 610 contacting the outer surface of the ultra-capacitor 110 may have a rounded shape in a cylinder. The case 200 may be fabricated by coupling two case blocks with an '⊂' shape, and accordingly the accommodation portion 618 may be formed.

In more detail, as shown in FIG. 6, the case block 610 includes a plurality of convex portions 611 having the same arc shape as the outer shape of the ultra-capacitor 110, a convex portion connector 613 connecting the convex portions 611, a concave portion 612 formed between the convex portion 611 and the convex portion connector 613, and a case block connector 614 connecting the case blocks 610.

The plurality of convex portions 611 have the same arc shape as the outer shape of the ultra-capacitor 110 to form the accommodation portion 618 accommodating the ultra-capacitor 110, and a heat-dissipating pad 210 is attached to an inner side thereof. The heat-dissipating pad 210 emits heat generated from the ultra-capacitor 110 to the convex portion 611 and also gives an insulation function between the ultra-capacitor 110 and the convex portion 611 (namely, the case 200). The convex portions 611 are connected by the convex portion connector 613, and a tab is formed at the convex portion connector 613 to fix an upper cover and a lower cover which cover the case 200. The tab is a structure for bolting, and a bolt for fixing the case 200 and the covers is inserted therein.

The case block 610 formed by connecting the plurality of convex portions 611 has a '⊂' shape. In order to connect two case blocks 610 in a width direction, outermost convex portions are disposed and connected in a width direction, and the other convex portions are disposed and connected in a longitudinal direction. In other words, the outermost convex portions of the plurality of convex portions 611 are connected so that the arc shapes of the convex portions 611 are connected.

The concave portion 612 is formed between the convex portion 611 and the convex portion connector 613. The concave portion 612 is formed by bending back a part of the convex portion 611 outwards in order to ensure an insulation distance, as described later. A plurality of heat-dissipating plates 617 are perpendicularly installed to the concave portion 612 at regular intervals to dissipate heat generated from the ultra-capacitor 110. In other words, in order to enhance heat-dissipating efficiency by means of air flows among the heat-dissipating plates 617, the heat-dissipating plates 617 are perpendicularly installed at regular intervals. In addition, in order to enlarge a heat-dissipating area, the plurality of heat-dissipating plates 617 are installed. At this time, the heat-dissipating plates 617 are formed to have the same height as the convex portion connector 613. In FIG. 6, it is depicted that the concave portion 612 is not formed at both sides of the convex portion connector 613 located at an outermost location in a longitudinal direction, but the concave portion 612 may be formed at both sides, similar to other convex portion connectors 613.

The case block connector 614 connects the cable blocks 610. The case block connector 614 extends from the convex portion 611 and is bent in a longitudinal direction, and also the case block connector 614 connects the case blocks 610 in a width direction.

The case 200 formed by coupling the case blocks 510, 610 as described above with reference to FIGS. 5 and 6 may be made of metal. The accommodation portion 518, 618 formed in the case 200 is fabricated to conform to the shape of the ultra-capacitor 110 as much as possible so that its shape corresponds to the outer surface of the ultra-capacitor 110. Therefore, a contact surface between the case 200 and the ultra-capacitor 110 is maximized to increase an area through which heat is dissipated, thereby enhancing heat-dissipating effects.

As described above, in order to further improve the heat-dissipating effect, in this embodiment, the heat-dissipating pad 210 is attached to the inner surface of the accommodation portion 518, 618. In other words, the heat-dissipating pad 210 may be attached to the inner surface of the accommodation portion 518, 618 so that the heat-dissipating pad 210 is located between the cell assembly 100 and the accommodation portion 518, 618 when the cell assembly 100 is inserted into the accommodation portion 518, 618. The heat-dissipating pad 210 may be attached to the inner surface of the accommodation portion 518, 618 in a longitudinal direction of an electrode of the ultra-capacitor 110. The width of the heat-dissipating pad 210 is smaller than a length of an arc formed by the accommodation portion 518, 618. If the width of the heat-dissipating pad 210 is greater than the length of the arc formed by the accommodation portion 518, 618, a part of the heat-dissipating pad 210 does not contact the accommodation portion 518, 618 and thus does not dissipate heat. On the contrary, the accommodation portion 518, 618 should have an arc with a length greater than the width of the heat-dissipating pad 210.

The heat-dissipating pad 210 may include a thermal conductive filler for heat transfer, for example metal powder or ceramic powder. The metal powder may be selected from aluminum, silver, copper, nickel, tungsten, and mixtures thereof. In addition, the ceramic powder may be selected from silicone, graphite and carbon black. In an embodiment of the present disclosure, the heat-dissipating pad 210 is not limited to specific materials. In addition, the heat-dissipating pad 210 may also be made of silicon composite rubber.

The heat-dissipating pad 210 may plays a role of fixing the ultra-capacitor 110 accommodated in the case 200. In other words, when the ultra-capacitor 110 is accommodated in the case 200, the heat-dissipating pad 210 may direct contact the ultra-capacitor 110 to prevent the ultra-capacitor 110 from moving. Even though the accommodation portion 518, 618 is fabricated with a shape corresponding to the outer surface of the ultra-capacitor 110, it is possible that the accommodation portion 518, 618 does not closely contact the ultra-capacitor 110 and thus may mot suitably dissipate heat. Therefore, if the heat-dissipating pad 210 is attached to the inner surface of the accommodation portion 518, 618 which contacts the ultra-capacitor 110, the heat-dissipating pad 210 may fix the ultra-capacitor 110 in the case 200 and also enlarge a contact area between the case 200 and the ultra-capacitor 110, thereby enhancing the heat-dissipating effect.

In addition, the heat-dissipating pad 210 may have elasticity. A plurality of ultra-capacitors 110 are inserted into the case 200, and the ultra-capacitors 110 may have different diameters. Accordingly, the ultra-capacitors 110 may not perfectly compressed to the heat-dissipating pad 210. For this reason, considering the difference in diameters of the ultra-capacitors 110, an elastic heat-dissipating pad 210 may be used so that all ultra-capacitors 110 may be sufficiently compressed to the heat-dissipating pad 210. At this time, a thickness of the heat-dissipating pad 210 before being compressed may be greater than a diameter tolerance of the ultra-capacitors 110. For example, if the ultra-capacitors 110 have a standard diameter of 60.7 mm and a tolerance of ±0.7 mm, the heat-dissipating pad 210 before being compressed may have a thickness greater than 1.4 mm (0.7 mm×2), and may have a thickness of, for example, 2 mm.

If the heat-dissipating pad 210 has elasticity, when the ultra-capacitor 110 is inserted into the case 200, the heat-dissipating pad 210 is deformed according to the outer shape of the ultra-capacitor 110, and thus the adhesion to the ultra-capacitor 110 may be enhanced, thereby increasing the contact area. Therefore, as the contact area increases, the heat-dissipating efficiency may be further enhanced.

Meanwhile, when the heat-dissipating pad 210 is used, an interval between the accommodation portion 518, 618 of the case 200 and the ultra-capacitor 110 may be smaller than the thickness of the heat-dissipating pad 210 before being compressed and greater than the diameter tolerance of the ultra-capacitors 110. Here, the interval between the accommodation portion 518, 618 and the ultra-capacitor 110 represents an interval when the energy storage device is assembled without using the heat-dissipating pad 210. The interval should be greater than the diameter tolerance of the ultra-capacitors 110 because the case is unstably assembled to create a gap when the interval is smaller than the diameter tolerance. In addition, the interval should be smaller than the thickness of the heat-dissipating pad 210 before being compressed in order to ensure the ultra-capacitors 110 to be sufficiently compressed to the heat-dissipating pad 210. If the interval is smaller than the thickness of the heat-dissipating pad 210 before being compressed, when the case is assembled, the ultra-capacitors 110 compress the heat-dissipating pad 210 to fix the ultra-capacitors 110 in the case 200 and enlarge a contact area between the ultra-capacitor 110 and the heat-dissipating pad 210, thereby enhancing the heat-dissipating effect.

In addition, though not shown in the figures, an adhesive layer may be provided at one side of the heat-dissipating pad 210 so that the heat-dissipating pad may be easily adhered to the accommodation portion 518, 618 of the case 200. Here, the adhesive layer may further include a thermal conductive filler, for example metal powder or ceramic powder, to prevent the thermal conductivity from deteriorating through the adhesive layer.

In this embodiment, since the heat-dissipating pad 210 is attached to the inner surface of the case 200, namely the inner surface of the accommodation portion 518, 618 which corresponds to the outer surface of the ultra-capacitor 110, heat is dissipated through the side of the case 200, thereby further enhancing the heat-dissipating performance. In addition, since the case 200 is made of material with excellent thermal conductivity such as copper or aluminum, the heat generated in the case 200 may be effectively transferred and dissipated to the outside.

In the existing technique, heat is mainly dissipated through a connection member, namely a bus bar, connecting ultra-capacitors 110 adjacent to each other, but the bus bar has so small area to dissipate heat sufficiently and thus has unsatisfactory heat-dissipating effect. For example, when the bus bar has a longitudinal length of 100 (mm) and a vertical length of 28 (mm), an area capable of dissipating heat through the bus bar for a single ultra-capacitor may be 100*28/2 (area of the bus bar for a single ultra-capacitor)*2 (top and bottom sides)=2800 (mm$^2$).

However, in this embodiment, as described above, the heat-dissipating area increases by means of the side of the case 200, and thus the heat in the case 200 may be dissipated out more effectively. In addition, since a heat-dissipating member having excellent thermal conductivity, namely the heat-dissipating pad 210, is attached to the inner surface of the case 200 which contacts the ultra-capacitor 110, the heat-dissipating performance may be improved further.

Figure 7:
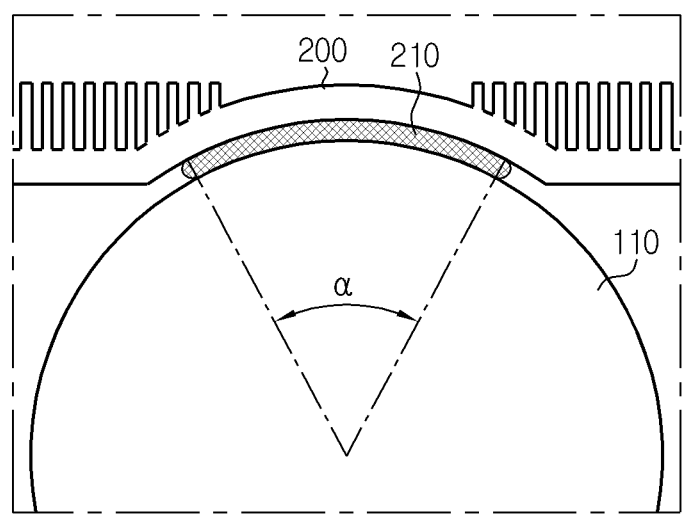
FIG. 7 is a diagram showing a central angle when the energy storage cell contacts a heat-dissipating pad according to an embodiment of the present disclosure.

For example, if a contact angle, namely a central angle, of the ultra-capacitor contacting the heat-dissipating pad 210 is 60 degrees as shown in FIG. 4, a heat-dissipating area for a single ultra-capacitor may be 2*3.14*(60 (diameter of the ultra-capacitor)/2)*130 (length of the heat-dissipating pad) (mm)*60 (angle)*2/360=8164 (mm$^2$). At this time, the angle is multiplied by 2 since the heat-dissipating pads 210 are attached to two points in this embodiment. Generally, the central angle is an angle formed by two radii at a circle or a fan shape, and in this embodiment of the present disclosure, the central angle represents an angle formed by two radii connecting from the center of the ultra-capacitor 110 to both ends of a contact portion between the heat-dissipating pad 210 and the ultra-capacitor 110. FIG. 7 is a diagram showing a central angle formed when the heat-dissipating pad 210 and the ultra-capacitor 110 make contact according to an embodiment of the present disclosure. As shown in FIG. 7, the central angle α is an angle formed by two radii connecting from the center of the ultra-capacitor 110 to both ends of a contact portion between the heat-dissipating pad 210 and the ultra-capacitor 110. In addition, both ends represent both ends when the heat-dissipating pad 210 is compressed between the ultra-capacitor 110 and the case 200.

Meanwhile, the contact angle, namely the central angle α, of the ultra-capacitor 110 contacting the heat-dissipating pad 210 may be 30 degrees to 60 degrees. The heat-dissipating efficiency when the central angle α is 30 degrees or above is much greater than the heat-dissipating efficiency when the central angle α is less than 30 degrees. In addition, if the contact area of the heat-dissipating pad 210 and the ultra-capacitor 110 increases, namely if the central angle α of the ultra-capacitor 110 contacting the heat-dissipating pad 210 is greater, the heat-dissipating efficiency becomes better, but the product mass of the energy storage device increases as much. If the central angle α is 30 degrees to 60 degrees, the product mass increases gently, but if the central angle α increases greater than 60 degrees, the product mass increases rapidly. Therefore, the central angle α of the ultra-capacitor 110 contacting the heat-dissipating pad 210 may be 30 degrees to 60 degrees. This will be described below with reference to the drawings.

Figure 9:
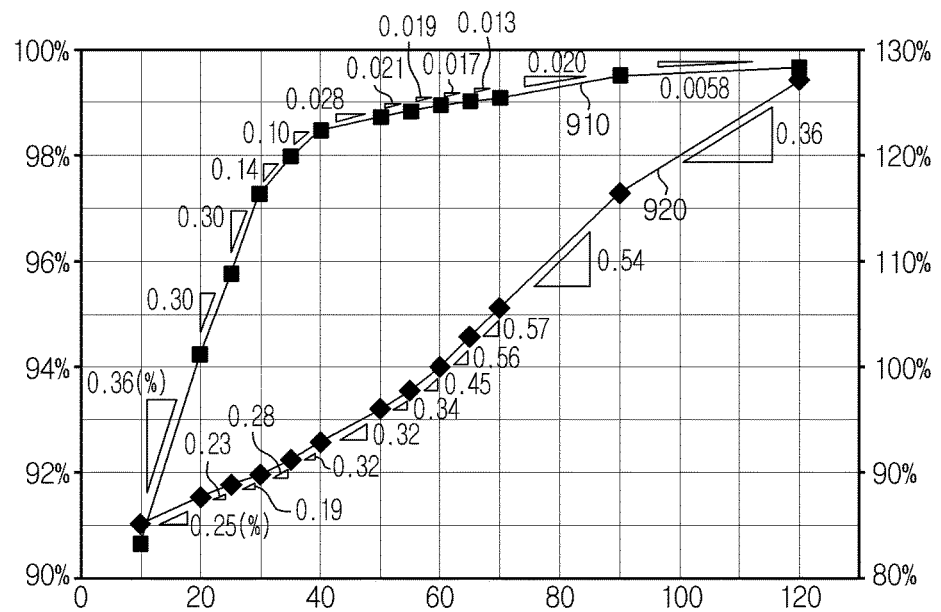
FIG. 9 is a graph showing the change of heat-dissipating efficiency and product mass depending on a contact angle according to an embodiment of the present disclosure.

FIG. 8 is a diagram showing a contact shape, heat-dissipating efficiency and a product mass of the heat-dissipating pad and the energy storage cell depending on the contact angle, according to an embodiment of the present disclosure, and FIG. 9 is a graph showing the change of heat-dissipating efficiency and product mass depending on the contact angle according to an embodiment of the present disclosure.

First, calculation conditions of the heat-dissipating efficiency are as in Table 1 below, and 18 ultra-capacitors are used as energy storage cells.

TABLE 1

|  | material | density [kg/m$^3$] | thermal conductivity [W/m · k] | specific heat [kj/kg · K] | viscosity [Pa · s] |
| --- | --- | --- | --- | --- | --- |
| air | air | incompressible ideal gas | 0.0242 | 1006.43 | 1.7894 × 10$^{-5}$ |
| case/cell | Al-6063-O | 2,700 | 218 | 871 | — |
| heat-dissipating pad | SB-7100 S/TUTG-E | 1,540 | 1.4 | 871 | — |

The heat-dissipating efficiency is calculated using the following equation.

$$\text{Heat-dissipating efficiency} = \frac{\text{Quantity of heat transferred to the case through the heat-dissipating pad}(W)}{\text{Quantity of heat emitting from the energy storage cell}(W)}$$

The product mass is calculated by adding a total weight of the ultra-capacitors, a mass of the case, a mass of the heat-dissipating pad and masses of other components.

Referring to FIG. 8, the energy storage cells, namely the ultra-capacitors 110, are inserted into the accommodation portion 518, 618 formed between the case blocks, and the heat-dissipating pad 210 contacting the ultra-capacitors 110 is attached to the inner surface of the accommodation portion 518, 618. In order to increase the contact area between the ultra-capacitor 110 and the heat-dissipating pad 210, the heat-dissipating pad 210 should have a greater width, and accordingly the length of the arc of the accommodation portion 518, 618 should also be increased. If the contact area between the ultra-capacitor 110 and the heat-dissipating pad 210 increases as described above, the central angle of the ultra-capacitor 110 contacting the heat-dissipating pad 210 also increases. In addition, the concave portion 512, 612 formed at the outer surface of the case 200 between adjacent ultra-capacitors 110 also has an increased depth.

In FIG. 9, a left Y axis represents heat-dissipating efficiency, and a right Y axis represents a product mass. In FIG. 9, a reference symbol 910 represents a graph of the heat-dissipating efficiency, and a reference symbol 920 represents a graph of the product mass. As shown in FIGS. 8 and 9, if the central angle α of the ultra-capacitor 110 contacting the heat-dissipating pad 210 increases, the energy storage device has better heat-dissipating efficiency. In particular, if the central angle α increases to 30 degrees or above, the heat-dissipating efficiency is improved rapidly in comparison to the case where the central angle α is less than 30 degrees. For example, when the central angle α is 10 degrees, the heat-dissipating efficiency is 90.66%, but when the central angle α is 30 degrees, the heat-dissipating efficiency is 97.28%. Thus, if the central angle α becomes 30 degrees, the heat-dissipating efficiency is improved greatly. In FIG. 9, numbers marked along the graph of heat-dissipating efficiency represents an increment of the heat-dissipating efficiency per 1 degree. For example, when the central angle α increases from 10 degrees to 20 degrees, the heat-dissipating efficiency increases by 0.36% point (3.6%÷10) per 1 degree on average. When the central angle α increases from 20 degrees to 25 degrees, the heat-dissipating efficiency increases by 0.30% point per 1 degree on average. As shown in FIG. 9, the heat-dissipating efficiency increases greatly until the central angle α becomes 30 degrees, and the increment of the heat-dissipating efficiency becomes smaller if the central angle α is over 30 degrees. Therefore, the central angle α of the ultra-capacitor 110 contacting the heat-dissipating pad 210 may be 30 degrees or above.

However, if the central angle α of the ultra-capacitor 110 contacting the heat-dissipating pad 210 increases over 30 degrees, the product mass of the energy storage device increases as much. In this case, since the width of the heat-dissipating pad 210 increases, the mass of the heat-dissipating pad 210 increases, and also the length of the arc of the accommodation portion 518, 618 increases. Thus, the concave portion 512, 612 formed at the outer surface of the case 200 between adjacent ultra-capacitors 110 increases, and thus the mass of the case 200 also increases. As shown in FIGS. 8 and 9, until the central angle α becomes 60 degrees, the product mass increases gently, but if the central angle α increases over 60 degrees, the product mass increases rapidly. In other words, an increase rate of the product mass at a central angle α greater than 60 degrees is greater than an increase rate of the product mass at a central angle α smaller than 60 degrees. In FIG. 9, numbers marked along the graph of the product mass represents an increment of the product mass per 1 degree. For example, when the central angle α increases from 10 degrees to 20 degrees, the product mass increases by 0.25% point (2.5%÷10) per 1 degree on average. When the central angle α increases from 20 degrees to 22.5 degrees, the product mass increases by 0.23% point per 1 degree on average. As shown in FIG. 9, until the central angle α becomes 60 degrees, the product mass increases gently, but if the central angle α increases over 60 degrees, the product mass increases rapidly. For example, when the central angle α increases from 55 degrees to 60 degrees, the product mass increases by 0.34% point per 1 degree, but if the central angle α increases from 60 degrees to 65 degrees, the product mass greatly increases by 0.45% point per 1 degree. Therefore, the central angle α of the ultra-capacitor 110 contacting the heat-dissipating pad 210 may be 30 degrees to 60 degrees.

Figure 10:
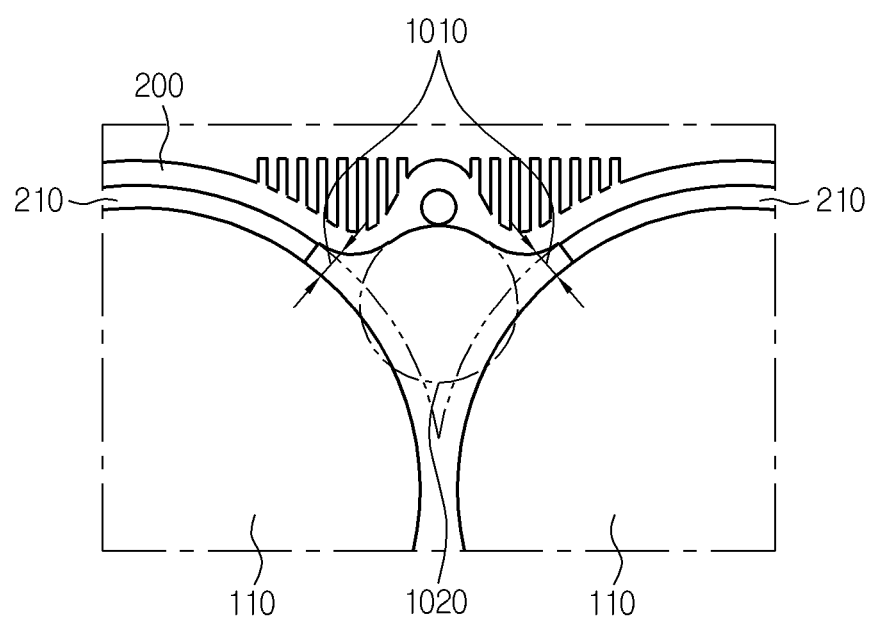
FIG. 10 is an enlarged view showing a portion A of FIG. 2.

FIG. 10 is an enlarged view showing a portion A of FIG. 2. Referring to FIG. 10, a distance 1010 between the case 200 and the ultra-capacitor 110 is gradually increasing from the concave portion 512, 612 formed by bending back the case 200. In other words, based on the front end of the concave portion 512, 612, the distance 1010 between the case 200 and the ultra-capacitor 110 is gradually increasing. The case 200 gradually spaced apart from adjacent concave portions 512, 612 of a specific cell encounters a case 200 gradually spaced apart from adjacent concave portions 512, 612 of an adjacent cell, at the convex portion connectors 513, 613, thereby configuring the case. As described above, the heat-dissipating pad 210 functions to insulate the case 200 and the ultra-capacitor 110 from each other along with the heat-dissipating function. At a portion where the heat-dissipating pad 210 is absent, namely from a point where the heat-dissipating pad 210 ends, the distance 1010 between the case 200 and the ultra-capacitor 110 is gradually increasing so that the case 200 and the ultra-capacitor 110 are indirectly insulated from each other. In addition to the insulation distance, an outer surface of each cell may also be covered by an insulation film or coated with an insulating material. In addition, as shown in FIG. 10, a space 1020 is formed between adjacent ultra-capacitors 110 and the case 200 so that a harness may be installed therein for sensing and balancing. The harness is provided through the space 1020, and also the flow of air present in the space 1020 gives additional heat-dissipating.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage device, comprising:
   a cell assembly formed by connecting at least two cylindrical energy storage cells in series;
   a case having an accommodation portion shaped corresponding to an outer surface of the energy storage cells to accommodate the cell assembly; and
   a heat-dissipating pad installed between the outer surface of the energy storage cells of the cell assembly and an inner surface of the accommodation portion,
   wherein the case includes at least two case blocks,
   wherein the accommodation portion is formed by coupling the case blocks,
   wherein the heat-dissipating pad has elasticity, and
   wherein an interval between the accommodation portion and the energy storage cells is smaller than a thickness of the heat-dissipating pad before being compressed and greater than a diameter tolerance of the energy storage cells.

2. The energy storage device according to claim 1, wherein the energy storage cells contact the heat-dissipating pad with a central angle of 30 to 60 degrees.

3. The energy storage device according to claim 2, wherein the accommodation portion forms an arc with a length greater than a length of the heat-dissipating pad.

4. The energy storage device according to claim 1, wherein the heat-dissipating pad is attached to the energy storage cells.

5. The energy storage device according to claim 1, wherein the heat-dissipating pad is a thermal conductive filler.

6. The energy storage device according to claim 1, wherein an adhesive layer is provided at one side of the heat-dissipating pad.

7. The energy storage device according to claim 1, wherein the energy storage cells are ultra-capacitors.

8. The energy storage device according to claim 1, wherein at least one of the case blocks includes:
a plurality of convex portions having the same arc shape as an outer shape of the energy storage cells;
a convex portion connector configured to connect the plurality of convex portions; and
a concave portion formed between the convex portions and the convex portion connector.

9. The energy storage device according to claim 8, wherein at least one heat-dissipating plate is formed at the concave portion to protrude perpendicularly.

10. The energy storage device according to claim 8, wherein the at least one of the case blocks has an 'L' shape or a '⊂' shape.

11. The energy storage device according to claim 10, wherein when the at least one of the case blocks has the 'L' shape, one of a plurality of outermost convex portions of the plurality of convex portions is connected so that the arc shapes of the convex portions are connected.

12. The energy storage device according to claim 11, wherein the at least one of the case blocks further includes a case block connector extending from one of the outermost convex portions and bent in a longitudinal direction of the at least one of the case blocks.

13. The energy storage device according to claim 10, wherein when the at least one of the case blocks has the '⊂' shape, a plurality of outermost convex portions of the plurality of convex portions are connected so that the arc shapes of the convex portions are connected.

14. The energy storage device according to claim 13, wherein the at least one of the case blocks further includes a case block connector extending from each of the outermost convex portions and bent in a longitudinal direction of the at least one of the case blocks.

15. The energy storage device according to claim 8, wherein a tab is formed at the convex portion connector to cover a cover.

16. The energy storage device according to claim 1, wherein a distance between the energy storage cells and the case is gradually increasing from an end point of the heat-dissipating pad so that the energy storage cells and the case are insulated from each other.

17. The energy storage device according to claim 1, wherein an insulation film is further formed at the outer surface of the energy storage cells.

* * * * *